United States Patent Office 3,547,847
Patented Dec. 15, 1970

3,547,847
AQUEOUS EMULSION COPOLYMERS OF VINYL ALKANOATES, ALKYL ACRYLATES, DRYING OIL AND ANOTHER UNSATURATED COMPOUND
Eli Levine, Union, and John Ribelle Costanza, North Plainfield, N.J., assignors to Celanese Corporation, New York, N.Y., a corporation of Delaware
No Drawing. Continuation-in-part of application Ser. No. 690,074, Dec. 13, 1967. This application Aug. 13, 1968, Ser. No. 752,144
Int. Cl. C09d 3/26; C08f 15/40
U.S. Cl. 260—22          8 Claims

ABSTRACT OF THE DISCLOSURE

Aqueous emulsion copolymers derived from vinyl alkanoates (e.g., vinyl acetate) and alkyl acrylates (e.g., ethyl acrylate) are modified by the incorporation of drying oils. The drying oils (e.g., linseed oil) are chemically combined with the vinyl alkanoates and alkyl acrylate components of the copolymer in an amount ranging from about 2 percent to about 50 percent by weight, based on the total weight of nonvolatiles present in the aqueous emulsion copolymer.

---

This application is a continuation-in-part of application Ser. No. 690,074 filed Dec. 13, 1967, now abandoned.

This invention relates to novel aqueous emulsion copolymers. More particularly, this invention relates to novel aqueous emulsion copolymers prepared from one or more vinyl monomers such as vinyl acetate, a lower alkyl acrylate or methacrylate, or the like, which have been modified to impart thereto improved adhesion to both chalky and glossy painted surfaces.

The coatings industry has made considerable progress in recent years in developing aqueous polymeric coating compositions. These so-called water-base paints, being substantially odorless, non-flammable and non-irritating to the skin, are useful not only as household paints but also in industrial applications. With the development of new polymers tailor-made for this use, aqueous polymeric coating compositions or latexes have been made with properties equal to or even superior to those possessed by some solvent-base paints. For example, typical latexes have excellent color-retention on outdoor exposure.

One undesirable feature associated with conventional oil-base and alkyd paints is chalking, which occurs on extended exterior exposure and is primarily the result of a combination of weathering and ultra-violet degradation of the polymeric binder. While common latex paints do not chalk on outdoor exposure, their adhesion to chalky surfaces is poor, and thus extensive surface preparation is necessary before they can be applied over chalked paint films. Oil-base and alkyd paints also have poor color-retention on outdoor exposure.

One expedient which has been used to permit the use of latex paints over chalked paint films without prior surface preparation involves emulsifying the latex paint with rather substantial amounts, i.e., usually up to about 25% and sometimes as much as 50% by weight, based on the emulsion solids, of a drying oil. Upon application the drying oil, which is merely physically present in the latex and forms an essentially incompatible mixture with it, goes out of the emulsion, penetrates the chalky surface, and possibly bonds with some oil or oil-like molecules from the original oil-base of alkyd paint which are found at the surface of the old paint film and beneath the chalky layer. This can result in the formation of a matrix for the chalky residue, which would then permit the latex portion of the emulsion to adhere to the painted surface.

Whatever the mechanism of action of these drying oil-latex paint emulsion, their use gives rise to as many problems as it solves. Thus, for example, such emulsions themsleves can chalk, due to the presence of the drying oil. They also have poor color retention. In essence, then, the use of drying oils physically emulsified with latex paints detracts from the very properties that are expected of latex paints.

The present invention provides a simple yet effective solution to this problem. More particularly, it has now been discovered, quite unexpectedly, that if amounts, i.e., from about 2% to about 50% by weight, and preferably from about 5% to about 40% by weight, based on the total amount of non-volatiles present, of a drying oil, e.g., safflower oil, linseed oil, castor oil, oiticica oil, sunflower oil, soybean oil, perilla oil, tall oil, dehydrated castor oil, poppy oil, tung oil, very long oil alkyds, long oil alkyds and the like are chemically combined with a vinyl alkanoate, said alkanoate having from 2 to 6 carbon atoms and at least one alkyl acrylate, said alkyl radical containing from 2 to 10 carbon atoms, highly desirable resins which when formulated into paints have improved properties such as adhesion characteristics, elongation, tensile strength and the like are obtained. Utilizing the compositions of this invention, adhesion characteristics of the formulated paints for exterior use over a chalky substrate are improved to such an extent that additional primers over the substrate are not required. Thus a single latex paint can be provided which can serve effectively as both base coat and topcoat.

The alkyl acrylate monomers which can be used in the composition are those wherein the alkyl radical can contain from 2 to 10 carbon atoms. These monomers include, among others: methyl acrylate, ethyl acrylate, propyl acrylate, n-butyl acrylate, isobutyl acrylate, 2-ethylhexyl acrylate, methyl methacrylate, ethyl methacrylate, isobutyl methacrylate, 2-ethyl hexyl methacrylate and the like or combinations thereof. The vinyl alkanoates which can be used herein include those having from 2 to 6 carbon atoms in the alkylate radical. Typical of the vinyl alkanoates include among others, vinyl acetate, vinyl propionate, vinyl butyrate, vinyl isobutyrate, vinyl valerate, vinyl caproate and the like.

Additional unsaturated compounds can be combined with the alkyl acrylates to provide desirable compositions. These compounds include aliphatic vinyl ethers, dialkyl esters of monoethylenically unsaturated dicarboxylic acids, polymerizable ethylenically unsaturated monocarboxylic and polycarboxylic acids, the available anhydrides, nitriles, unsubstituted amides, substituted amides of said acids, substituted and unsubstituted aminoalkyl acrylates and methacrylates, styrene among others.

The amounts of the vinyl alkanoates can range from about 50 to about 90 percent, preferably from about 65 to 85 percent, by weight of the total copolymer, the amounts of alkyl acrylates can range from about 10 to about 30 weight percent, preferably from about 15 to about 25 weight percent based on the total copolymer.

The polymerization temperature required to produce the aqueous emulsions of this invention will generally range from about room temperature or lower to about 100° C. or above, and preferably from about 60 to 90° C. and can be varied as the final polymerization proceeds towards substantial completion. Subatmospheric, atmospheric or superatmospheric pressures can be employed curing all or part of the polymerization, and depending on the monomers and catalyst employed in the reaction, can be carried out, if desired, under an inert atmosphere, e.g., under an inert nitrogen or carbon dioxide atmosphere. Thus, for example, polymerizations carried out at temperatures 10° C. or more below the boiling point of the lowest boiling monomer present, will usually take place under an inert atmosphere.

The surfactants which can be used in the process of this invention can include, any anionic or non-ionic surfactant (which can also be termed an emulsifying agent, a dispersing agent or a wetting agent), or mixtures thereof, which can be employed in preparing conventional acrylic polymer emulsions, can be used.

Among the non-ionic surfactants which can be used are polyethers, e.g., ethylene oxide and propylene oxide condensates in general, which include straight and branched-chain alkyl and alkylaryl polyethylene glycol and polypropylene glycol ethers and thioethers, and more particularly substances such as the "Igepals," which are members of a homologous series of alkylphenoxypoly(ethyleneoxy)ethanols, included among which are alkylphenoxypoly(ethyleneoxy)ethanols having alkyl groups containing from about 7 to about 18 carbon atoms, inclusive, and having from about 10 to about 150 ethyleneoxy units, such as the heptylphenoxypoly(ethyleneoxy)ethanols, nonylphenoxypoly(ethyleneoxy)ethanols and dodecylphenoxypoly(ethyleneoxy) ethanols; the "Tweens," which are polyoxyalkylene derivatives of hexitol (including sorbitans, sorbides, mannitans and mannides) anhydride partial long chain fatty acid esters, such as the polyoxyalkylene derivatives of sorbitan monolaurate, sorbitan monopalmitate, sorbitan monostearate, sorbitan tristearate, sorbitan monooleate and sorbitan trioleate; the "Pluronics," which are condensates of ethylene oxide with a hydrophobic base, said base being formed by condensing propylene oxide with propylene glycol; sulfur-containing condensates, e.g., those prepared by condensing ethylene oxide with higher alkyl mercaptans, such as nonyl dodecyl or tetradecyl mercaptan, or with alkylthiophenols wherein the alkyl group contains from 6 to 15 carbon atoms; ethylene oxide derivatives of long-chain carboxylic acids such as lauric, myristic, palmitic or oleic acid, or mixtures of acids, such as tall oil, and ethylene oxide derivatives of long-chain alcohols such as octyl, decyl, lauryl, or cetyl alcohol.

Among the anionic surfactants which can be used are the higher molecular weight sulfates and sulfonates, e.g., sodium and potassium alkyl, aryl and alkylaryl sulfates and sulfonates such as sodium 2-ethylhexyl sulfate, potassium 2-ethylhexyl sulfate, sodium nonyl sulfate, sodium undecyl sulfate, sodium tridecyl sulfate, sodium pentadecyl sulfate, sodium lauryl sulfate, sodium methylbenzene sulfonate, potassium methylbenzene sulfonate, sodium dodecylbenzene sulfonate, potassium toluene sulfonate and sodium xylene sulfonate, higher fatty alcohols, e.g., stearyl, lauryl, etc., which have been ethoxylated and sulfonated, dialkyl esters of alkali metal sulfosuccinic acid salts, such as sodium diamyl sulfosuccinate, sodium dihexyl sulfosuccinate and sodium dioctyl sulfosuccinate, and formaldehydenaphthalenesulfonic acid condensation products.

The amount of surfactant employed in the emulsion polymerization process, will range in an amount from about 1% to about 10% by weight, based on the total weight of the monomer emulsion, and this can be the case whether a non-ionic surfactant is employed. However, it is preferred when using typical non-ionic surfactants, e.g., those of the above-described alkylphenoxypoly(ethyleneoxy)ethanols which contain from about 30 to about 100 ethyleneoxy units, or typical anionic surfactants, e.g., an ethoxylated higher fatty alcohol which has also been sulfonated, to employ them in amounts ranging from about 1.5% to about 6% by weight, on the above-stated basis.

Aside from the surfactant mixture employed the monomer reactants can also contain small amounts of one or more protective colloids, particularly when a reflux-type polymerization is carried out using vinyl acetate or the like as part of the monomer charge. Included among such materials are ether linkage-containing protective colloids, such as hydroxymethyl cellulose, hydroxyethyl cellulose, ethylhydroxyethyl cellulose, carboxymethyl cellulose, ethoxylated starch derivatives, and the like. However, other protective colloid-forming substances, i.e., ones containing no ether linkages, can also be used either alone or together with the aforementioned ether linkage-containing materials, and included among these are partially and fully hydrolyzed polyvinyl alcohols, polyacrylic acid, sodium and other alkali metal polyacrylates, polyacrylamide, poly(methyl vinyl ether/maleic anhydride), polyvinylpyrrolidone, water soluble starch, glue, gelatin, water soluble alginates such as sodium or potassium alginate, casein, agar, and natural and synthetic gums, such as gum arabic and gum tragacanth. All of these materials will be used in the amounts found in conventional emulsion polymerization procedures, i.e., in amounts usually ranging from about 0.1% to about 2% by weight, based on the total weight of the polymer emulsion.

The monomer or monomers will be polymerized by means of a catalytic amount of a conventional free radical polymerization catalyst or catalyst system (which can also be referred to as an addition polymerization catalyst, a vinyl polymerization catalyst or a polymerization initiator), preferably, although not necessarily one which is substantially water soluble. Among such catalysts are inorganic peroxides such as hydrogen peroxide, alkali metal (e.g., sodium, potassium or lithium) and ammonium persulfates, perphosphates and perborates, azonitriles, such as $\alpha,\alpha$-azobisisobutyronitrile, and redox systems, including such combinations as mixtures of hydrogen peroxide, t-butyl hydroperoxide, or the like and any of an iron salt, a titanous salt, zinc formaldehyde sulfoxylate or sodium formaldehyde sulfoxylate; an alkali metal or ammonium persulfate, borate or perchlorate together with an alkali metal bisulfite such as sodium metabisulfite; an alkali metal persulfate together with an arylphosphinic acid such as benzenephosphinic acid, and the like.

In accordance with the customary practice of the art, the amount of polymerization catalyst employed will be no more than that required to obtain substantially complete monomer conversion at lowest catalyst cost. Thus, for example, from about 0.3% to about 0.5% by weight of a perchlorate such as ammonium perchlorate together with approximately equal amount of a bisulfite such as sodium metabisulfite, and preferably about 0.4% by weight of the perchlorate together with about 0.4% by weight of the bisulfite, each of these weight percentages being based on the total weight of the monomer emulsion, can be employed.

It is also possible, when using redox catalyst systems, to dissolve the oxidant, e.g., ammonium persulfate, in the surfactant-water mixture prior to the preparation of the monomer pre-emulsion, and to then add the reductant, together with the oxidant-containing monomer pre-emulsion, to the water in which it will be polymerized.

The amount of water to which the monomers are added will be determined by the solids content desired in the finished polymer emulsion. These solids content can range from as low as 20 percent to as high as 70 percent or higher.

The following examples will serve to illustrate the invention hereinabove described without limiting the same:

EXAMPLE 1

The following materials were mixed together:

| | Grams |
|---|---|
| Vinyl acetate | 1309.5 |
| Ethyl acrylate | 315.9 |
| Di-2-ethylhexyl maleate | 123.0 |
| Total | 1748.4 |

The mixture is designated compound (A). Into a reaction vessel is placed 240 grams of compound (A), 870.0 grams deionized water, 2.1 grams potassium persulfate, non-ionic surfactant agents, 20.7 grams Igepal CO–630 and 115.5 grams Igepal CO–977 [Igepal is a nonylphenoxypoly(ethyleneoxy) ethanol], 14.4 grams Tergitol NP–14, 12 grams hydroxyalkyl cellulose, and 3.0 grams sodium bicarbonate. The temperature is raised to 72° C. Over a period of 4 hours, 1230.0 grams of compound (A), 150 grams deionized water and 0.9 gram potassium persulfate is added in a continuous means. At this point, 278.4 grams of compound (A) and 193.8 grams alkali refined linseed oil is added to the reaction flask over a 90 minute period in a continuous means. Simultaneously 4.5 grams of potassium persulfate and 75 grams deionized water is added over a two-hour period in a continuous means. Upon the conclusion of all additions, the temperature is raised to 90° C. After 30 minutes at 90° C., the batch is cooled and filtered. The viscosity of the aqueous emulsion is 2250 centipoises, the pH was 2.5, and the total non-volatile content is found to be 62.8 percent. Testing of this emulsion is indicated in comparative data hereinafter.

EXAMPLE 2

Into a reaction vessel is placed 59.9 grams vinyl acetate, 14.5 grams ethylacrylate, 5.6 grams di-2-ethylhexyl maleate, 290 grams deionized water, 0.7 gram potassium persulfate, 4.0 grams hydroxyalkyl cellulose, 38.5 grams Igepal CO–977 and 6.9 grams Igepal CO–630 [Igepals are non-ionic surfactants nonylphenoxypoly(ethyleneoxy) ethanol], 4.6 grams Tergitol NP–14 [non-ionic surfactant trimethyl nonyl alcohol-ethylene oxide reaction product] and 1.0 gram sodium bicarbonate. The temperature of the reaction mixture was raised to 72° C. At this time an addition of a combination of 349.1 grams vinyl acetate, 84.1 grams ethyl acrylate and 32.8 grams di-2-ethylhexyl maleate to the material in the reaction vessel begins. The addition in a continuous means is controlled to last for four hours and fifty minutes. Simultaneously as the monomers are added, a mixture of 0.3 gram of potassium and 50.0 grams of deionized water is added to the reaction vessel controlled to last by continuous feeding over four hours. After the monomers have been added, a second portion of the combination of 76.0 grams vinyl acetate, 18.4 grams ethyl acrylate, and 7.0 grams di-2-ethylhexyl maleate was begun and controlled to last 1 hour and 10 minutes. Simultaneously to this addition, a mixture of 1.5 grams potassium persulfate and 25 grams deionized water were also added on a continuous basis for one hour and 10 minutes. After all the reactants are added, the temperature of the reaction mixture is raised to 90° C., held there 30 minutes. At this time the reaction product is cooled and filtered. The emulsion product of this reaction has a non-volatile content of 64.8 percent, a viscosity of 2220 centipoises and a pH of 3.9.

This emulsion is divided into two portions. The first is retained without modification. The second portion is modified by the addition of linseed oil and water such that the proportion of oil to polymer solids is 1 to 9 and the total non-volatile content is 65 percent. The latter emulsion is hereinafter referred to as the mechanical mixture. This mixture is made at ambient temperatures by simply adding the oil and water to the emulsion under good agitation until the resulting emulsion appeared uniform. By this procedure, the addition of the linseed oil is an attempt to prevent any significant chemical modification of the linseed oil and the other components of the emulsion.

EXAMPLE 3

The emulsion of Example 1 is a chemically modified oil-emulsion and those emulsions of Example 2 which are mechanical oil mixture and oil-free emulsion were cast as films on glass under the same conditions for comparative purposes as indicated in the results of Table I below:

TABLE I

| Emulsions | Maximum tensile strength, units | Percent elongation |
| --- | --- | --- |
| Example 1 (oil present during polymerization) | 435 | 1,050 |
| Example 2 (oil-mechanical mixture) | 484 | 853 |
| Example 3 (oil-free emulsion) | 755 | 855 |

Comparison of Example 3 (oil-free emulsion) with the oil-mechanical mixture of Example 2 shows that the addition of linseed oil causes a significant decrease in tensile strength without, in any way, changing the ultimate elongation. Results such as these are believed to be typical of two phase systems. The oil in the emulsion having the mechanical mixture of oil appears to act as a plasticizer having a low solubility in the resin. This oil appears to be expelled from between adjacent polymer molecules and migrates to the air-resin interface or it could accumulate in oil-rich pockets within the resin, leaving the bulk of the resin unplasticized. The reduction in tensile strength of a mechanical mixture of oil as opposed to the oil-free emulsion could be related to the reduction in amount of resin in the mechanical mixture sample and to the introduction of oil rich flaws within the film, through which mechanical failure readily occurs. The cast film of the chemically added drying oil emulsion shows itself to be considerably different than either of the other two emulsions. These cast films have the lower tensile strength normally noted in a plasticized product but its extensibility as measured by the ultimate elongation has been increased by approximately 24 percent, relative to the other two emulsions.

Visual comparison of the films of the chemically added drying oil emulsion and the oil mechanical mixture offers an interesting contrast in compatibility. The film of the oil mechanical mixture of Example 2 has a dull, turbid appearance characteristic of a blend of incompatible film formers. On the other hand, the film of the chemically added drying oil emulsion produced a film which is markedly glossier and clearing, indicating a greater degree of uniformity. The difference between the two films in adhesion to glass is equally obvious. The oil mechanical mixture exhibited much poorer adhesion to glass than did a film of the chemically modified emulsion indicating that the resinous fraction of the mechanical mixture was literally separated from the substrate by a film of linseed oil. This difference also is apparent when these emulsions were formulated into water-based paints. The important feature of the chemically modified oil emulsion water-based paint is its ability to adhere to a chalky surface.

EXAMPLE 4

In a reaction vessel is placed 1010 grams deionized water, 2.25 grams sodium persulfate, 15 grams 20 percent potassium hydroxide solution, 6 grams hydroxyethyl cellulose having a low viscosity, 8.7 grams of a surface active agent (monoester of phosphoric acid), 72 grams Igepal CO–897 and 11.5 grams Igepal CO–630 [Igepals are non-ionic surfactants nonylphenoxypoly (ethyleneoxy) ethanol]. The temperature of the ingredients in the reaction vessel is raised to 74–75° C. At this time an addition of a combination of 700 grams vinyl acetate, 120 grams 2-ethylhexyl acrylate and 6 grams of methacrylic acid to the material in the reaction vessel is begun as well as a separate addition of 150 grams of deionized water and 0.9 gram sodium persulfate. The addition of these combinations is in a continuous means and is controlled to last 2 hours and 20 minutes. At this time, the combination of 18 grams Igepal CO–897, 3.5 grams Igepal CO–630, 2.1 grams hydroxyethyl cellulose and 45 grams of deionized water are added to the reaction mixture. After this addition, a second combination of 270 grams 2-ethylhexyl acrylate, 6 grams methacrylic acid and 472 grams of a long oil alkyd containing 75 percent safflower oil, 17 percent isophthalic acid and 8 percent pentaerythritol is begun to be added in a continuous means, controlled to last 1 hour and 40 minutes. Simultaneously as the second monomer addition is being made, a mixture of 160 grams deionized water and 3.6 grams sodium persulfate is also added on a continuous basis to last 1 hour and 20 minutes. After all the ingredients have been added to the reaction mixture, the reaction temperature is raised to 90° C. and held there for half hour. The reaction mixture is then cooled to 40° C. The long oil alkyd content of this resin constitutes 30 weight percent of the resin solids. Films of these emulsions were cast on glass under the same conditions as set forth in Example 1. The cast film of this example provides similar results to those of Example 1, i.e., improved results over mechanical mixtures of long oil alkyd and emulsions. If it is desired to improve wet adhesion properties of the film of this example, a small amount of a cross-linking material such as ethylenimine can be added to the emulsion.

EXAMPLE 5

In the same manner as Example 4, a monomer modified alkyd emulsion can be produced wherein butyl acrylate can be substituted for 2-ethylhexyl acrylate and ethyl acrylate in Example 4. In this particular case, the amount of butyl acrylate is used to provide a resin wherein the long oil alkyd content of the resin constitutes 40 weight percent of the resin solids. Similar results of the films cast on glass of this emulsion are obtained as were obtained in Example 4.

It is to be understood that the foregoing description is merely illustrative of preferred embodiments of the invention of which many variations may be made by those skilled in the art within the scope of the following claims without departing from the spirit thereof.

What is claimed is:
1. Aqueous emulsion copolymers of vinyl alkanoates wherein the alkanoate radical contains from 2 to 6 carbon atoms; at least one alkyl acrylate wherein the alkyl radical contains from 2 to 10 carbon atoms; an unsaturated compound selected from the group consisting of aliphatic vinyl ethers, dialkyl esters of monoethylenically unsaturated dicarboxylic acids, polymerizable ethylenically unsaturated monocarboxylic acids, and polymerizable ethylenically unsaturated polycarboxylic acids; and a drying oil selected from the group consisting of natural drying oils and long oil alkyds, said drying oil being used in an amount between about 2 percent and about 50 percent by weight based on the total weight of the copolymer.

2. The composition of claim 1 wherein the vinyl alkanoates are present in amounts ranging from about 50 to about 90 percent by weight of the copolymer and the alkyl acrylates are present in amounts ranging from about 10 to about 30 percent by weight of the copolymer.

3. The composition of claim 2 wherein the vinyl alkanoates are present in amounts ranging from about 50 to about 70 percent by weight of the copolymer, the alkylacrylates are present in amounts ranging from about 15 to about 25 percent by weight of the copolymer, the drying oil is present in amounts ranging from about 5 to about 40 percent by weight of the copolymer, and the unsaturated compound is di-2-ethylhexyl maleate or methacrylic acid.

4. The composition of claim 3 wherein the vinyl alkanoate is vinyl acetate.

5. The composition of claim 3 wherein the alkyl acrylate is ethyl acrylate.

6. The composition of claim 3 wherein the alkyl acrylate is a combination of ethylacrylate and 2-ethylhexyl acrylate.

7. The composition of claim 3 wherein the drying oil is linseed oil.

8. The composition of claim 3 wherein the drying oil is a long oil alkyd.

References Cited

UNITED STATES PATENTS 3,296,169  1/1967  Corey _____ 260—29.6
3,332,899  7/1967  Cummings et al. _____ 260—23

DONALD E. CZAJA, Primary Examiner

D. J. BARRACK, Assistant Examiner

U.S. Cl. X.R.

260—8, 17, 23, 29.6, 30.8, 31.4, 33.2